S. MAY.
METHOD OF MAKING SAUSAGE CASINGS.
APPLICATION FILED MAR. 7, 1912.

1,036,291.

Patented Aug. 20, 1912.

Inventor
Solomon May

Witnesses

By Sturtevant & Mason
Attorneys

UNITED STATES PATENT OFFICE.

SOLOMON MAY, OF CHICAGO, ILLINOIS.

METHOD OF MAKING SAUSAGE-CASINGS.

1,036,291.  Specification of Letters Patent.  Patented Aug. 20, 1912.

Application filed March 7, 1912. Serial No. 682,311.

*To all whom it may concern:*

Be it known that I, SOLOMON MAY, a citizen of the United States, residing at Chicago, in the county of Cook, State of Illinois, have invented certain new and useful Improvements in Methods of Making Sausage-Casings, of which the following is a description, reference being had to the accompanying drawing and to the figures of reference marked thereon.

My invention relates to an improved method of manufacturing sausage casings, the object being to provide a method by which animal intestines may be so treated that they may be cut up into various sizes suitable for the purpose, and the edges stitched together.

The invention consists, therefore, in the process hereinafter described and set forth in the claims.

The invention is illustrated in the accompanying drawings, in which,—

Figure 1:
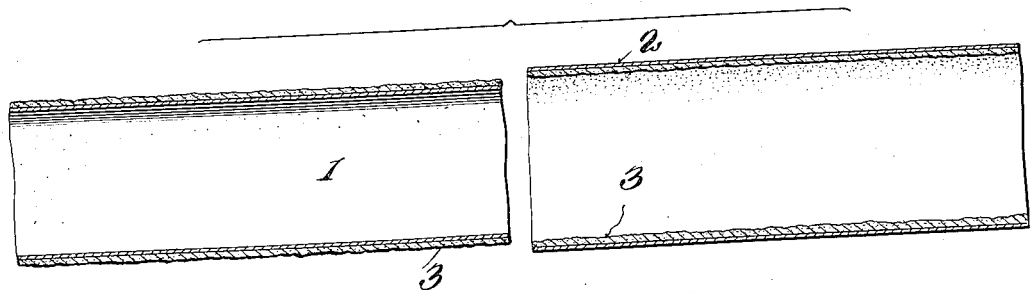
Figure 2:
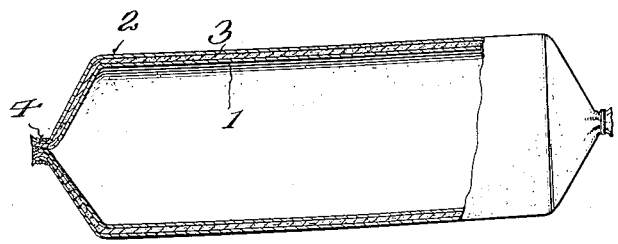
Figure 3:
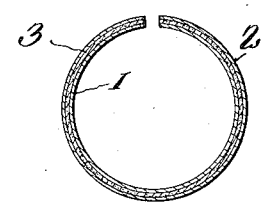
Figure 4:
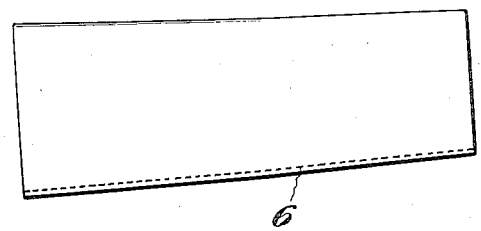
Figure 5:
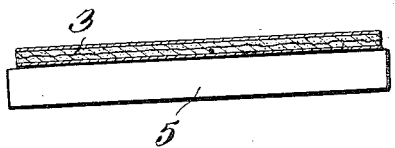

Figure 1 represents sections of two intestines, one turned inside out, and of which the sausage casings are composed, this being the first step in my improved method; Fig. 2 is a sectional view of the parts shown in Fig. 1, after they have been put together and distended as by use of air; Fig. 3 is a cross section after they have been cut lengthwise; Fig. 4 is a plan view of a tapered casing after stitching; and Fig. 5 is a sectional view showing a modified way of stretching the material.

While the intestine of which I intend to make a specialty in the manufacture of my improved sausage casings is the large intestine of the hog, it will be understood that the same method may be applied to other intestines, bladders, or to any of the membranes used for sausage covers. In their original condition, these intestines are very slimy, and it is impossible to sew two of them together by machine, and even if partially dried, the handling of each one separately is very difficult, for the reason that the two edges are not even, and slip away from each other, besides decreasing the capacity, because even if it can be sewed at all, a large margin must be taken up to prevent tearing.

In carrying out my method, I first take the intestines 1, 2, after they have been cured in salt and soak them in water, rendering them soft and pliable. The fat is then removed by scraping, but on the interior surface there is still left a layer of slimy material 3. I then turn one intestine inside out, as shown on the left hand of Fig. 1, and slip it inside the other. I then tie one end of the double casing as at 4, and distend the same by blowing up from the other end, and tie that end, leaving them in this condition, (see Fig. 2) until dry. During this drying operation, the slimy surfaces in contact set and when dry, hold the material in stretched condition. As shown in Fig. 3, instead of distending by use of air and then drying, I may cut the intestines open and stretch the two thicknesses with their slimy edges in contact over a board or frame 5. When sufficiently stretched and dried, the ends may be trimmed off and the tube then severed lengthwise, the edges overlapped or turned in, and stitched, as at 6 on a machine, preferably in tapered form, as shown in Fig. 4, and the tapered tube is then cut into lengths suitable for the length of sausage desired.

I do not claim herein the sausage casing made by this method, as that forms the subject matter of an application filed by me of even date herewith, Serial No. 682,310.

Having thus described my invention, what I claim as new and desire to secure by Letters Patent, is:—

1. The herein described method of treating intestines, for the manufacture of sausage casings, which consists in placing the inner surfaces of two intestines in contact, stretching and drying the same, and then cutting into lengths.

2. The herein described method of treating intestines for the manufacture of sausage casings, which consists in turning one intestine inside out and placing it within another forming a tube, blowing up the same, and drying while under air pressure, then cutting the tube lengthwise, stitching the edges together, and finally severing into suitable lengths.

In testimony whereof, I affix my signature in the presence of two witnesses:

SOLOMON MAY.

Witnesses:
 JAMES S. AGAR,
 JNO. W. BURNS.